(12) United States Patent
Xiao et al.

(10) Patent No.: US 9,233,474 B2
(45) Date of Patent: Jan. 12, 2016

(54) CLAMPING APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xin-Yin Xiao, Shenzhen (CN); Bo Yang, Shenzhen (CN); De-Yang Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/301,754

(22) Filed: Jun. 11, 2014

(65) Prior Publication Data

US 2014/0367987 A1   Dec. 18, 2014

(30) Foreign Application Priority Data

Jun. 13, 2013  (CN) .......................... 2013 1 02316292

(51) Int. Cl.
*B65G 47/90*  (2006.01)
*B25J 15/02*  (2006.01)
*B25J 15/00*  (2006.01)

(52) U.S. Cl.
CPC ............ *B25J 15/022* (2013.01); *B25J 15/0052* (2013.01)

(58) Field of Classification Search
CPC .... B25J 15/0616; B25J 15/00; B25J 15/0009; B25J 15/022; B25J 15/0052; A47G 21/10; A01D 87/003; B25B 9/00; B66C 1/24; B66C 1/585
See application file for complete search history.

(56) References Cited

U.S. PATENT DOCUMENTS

| | | | |
|---|---|---|---|
| 4,621,852 A * | 11/1986 | Maki | 294/86.4 |
| 4,718,709 A * | 1/1988 | Myers et al. | 294/106 |
| 4,728,137 A | 3/1988 | Hamed et al. | |
| 6,082,080 A * | 7/2000 | Holter et al. | 53/540 |
| 7,207,610 B1 * | 4/2007 | Kauppila | 294/198 |
| 7,887,108 B1 * | 2/2011 | Cawley et al. | 294/2 |
| 8,317,241 B2 * | 11/2012 | Ehnes et al. | 294/2 |

FOREIGN PATENT DOCUMENTS

| | | |
|---|---|---|
| CN | 201405355 Y | 2/2010 |
| CN | 201702776 U | 1/2011 |

* cited by examiner

*Primary Examiner* — Stephen Vu
(74) *Attorney, Agent, or Firm* — Novak Druce Connolly Bove + Quigg LLP

(57) ABSTRACT

A clamping apparatus includes a support, a fixing shaft fixedly mounted on the support, a driving mechanism supported by the support, and at least two clamping assemblies positioned on the fixing shaft and the moving shaft. The driving mechanism includes a driving member fixed on the support, and a moving shaft assembled to the driving member. Each clamping assembly includes a first clamping member, a second clamping member, a first connecting member, and a second connecting member. The first clamping member and the second clamping member are pivotally coupled with the fixing shaft, the first connecting member is hinged with the first clamping member and the moving shaft, the second connecting member is hinged with the second clamping member and the moving shaft. The first clamping member and the second clamping member of each clamping assembly are capable of moving toward each other for clamping a workpiece.

16 Claims, 3 Drawing Sheets

CLAMPING APPARATUS

FIELD

The subject matter herein generally relates to clamping apparatuses, especially to a clamping apparatus used in a robot.

BACKGROUND

Robots are usually used in manufacturing. A clamping apparatus is assembled to the robot for transferring or moving a workpiece.

BRIEF DESCRIPTION OF THE DRAWINGS

Implementations of the present technology will now be described, by way of example only, with reference to the attached figures.

DETAILED DESCRIPTION

Figure 1:
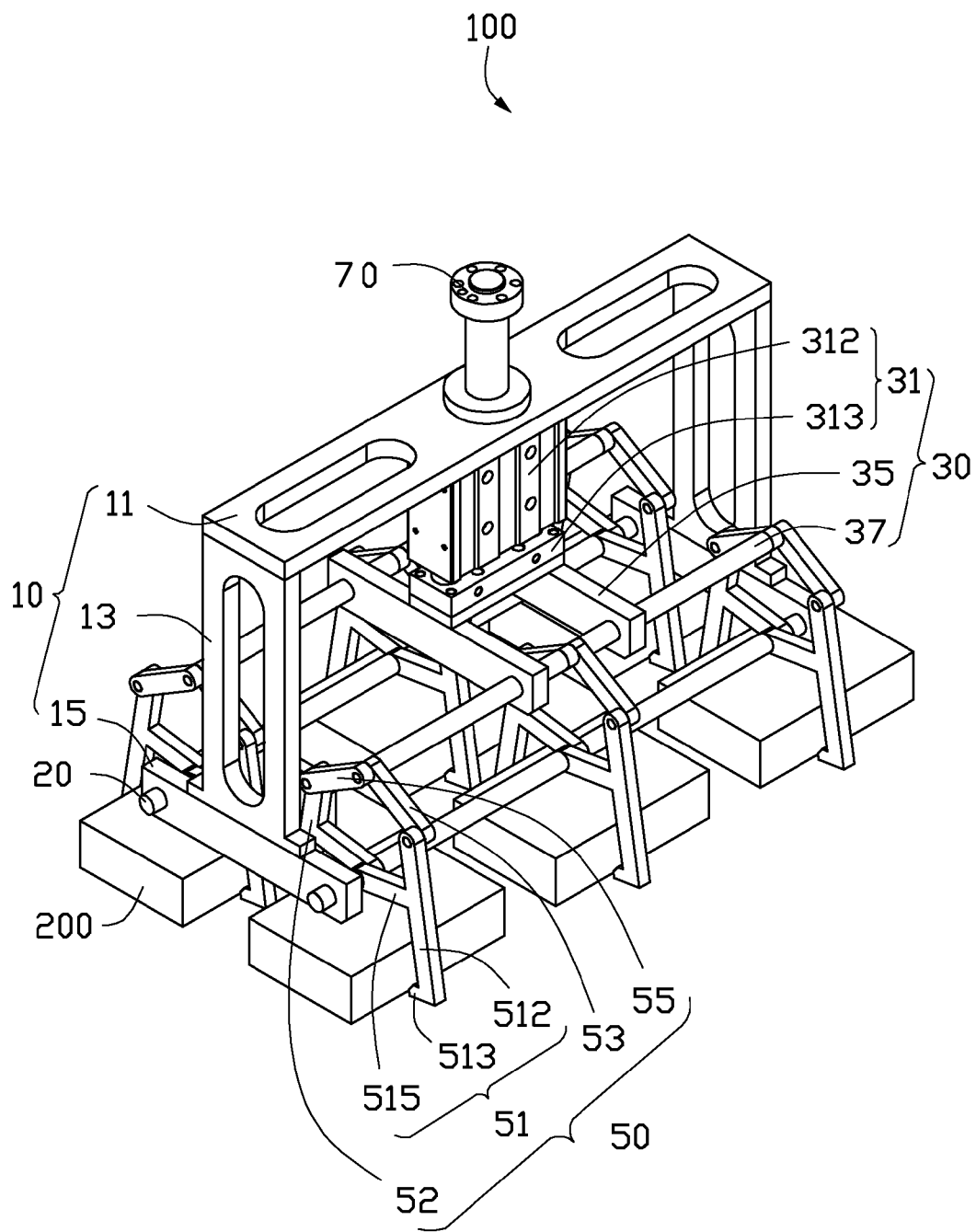
FIG. 1 is an assembled, isometric view of an embodiment of a clamping apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A clamping apparatus can include a support, a fixing shaft fixedly mounted on the support, a driving mechanism supported by the support, and at least two clamping assemblies positioned on the fixing shaft and the moving shaft. The driving mechanism can include a driving member fixed on the support, and a moving shaft assembled to the driving member. Each clamping assembly can include a first clamping member, a second clamping member, a first connecting member, and a second connecting member. The first clamping member and the second clamping member can be pivotally coupled with the fixing shaft, the first connecting member can be hinged with the first clamping member and the moving shaft, and the second connecting member can be hinged with the second clamping member and the moving shaft. The first clamping member and the second clamping member of each clamping assembly can be capable of moving toward each other for clamping a workpiece.

A clamping apparatus can include a support, a driving member fixed on the support, and a bar linkage mechanism. The bar linkage mechanism can include a fixing shaft fixedly mounted in the support, a moving shaft movably mounted on the driving member, and a clamping assembly. The clamping assembly can include a first clamping member, a second clamping member, a first connecting member, and a second connecting member. The first clamping member and the second clamping member can pivotally couple with the fixing shaft, respectively. The first connecting member can be hinged with the first clamping member and the moving shaft. The second connecting member can be hinged with the second clamping member and the moving shaft. The first clamping member and the second clamping member can be capable of moving toward each other for clamping a workpiece, or apart from each other for releasing the workpiece.

The present disclosure is described in relation to a clamping apparatus in a present embodiment. FIG. 1 illustrates a clamping apparatus 100 for clamping a plurality of workpieces 200. The clamping apparatus 100 can include a support 10, two fixing shafts 20 positioned on the support 10 and parallel to one another. The clamping apparatus 100 can also include a driving mechanism 30 fixedly mounted on the support 10 and positioned above on the two fixing shafts 20, and six clamping assemblies 50 coupling with the two fixing shafts 20 and the driving mechanism 30. The driving mechanism 30 is capable of moving the clamping assemblies 50 to clamp or release workpieces 200.

Figure 2:
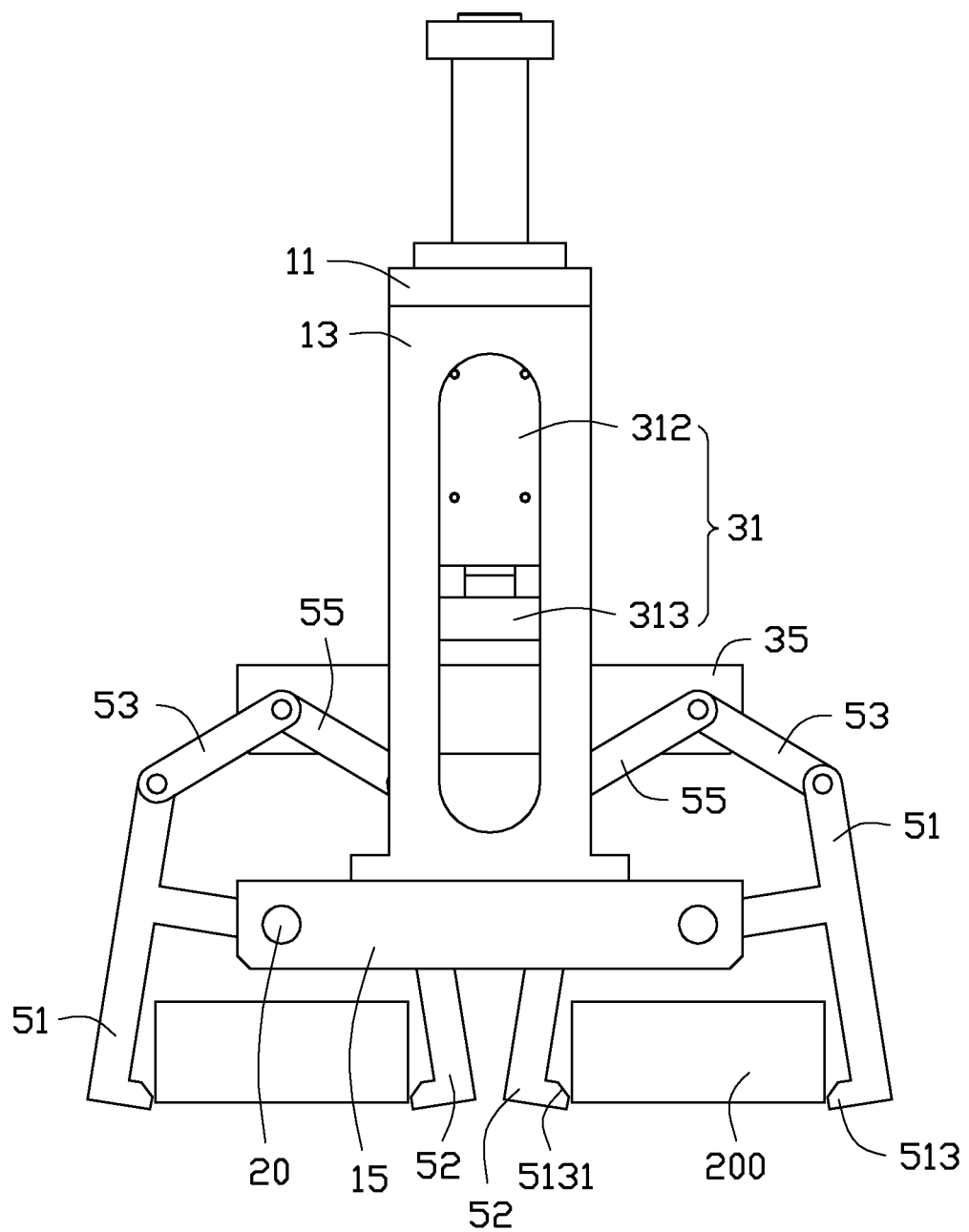
FIG. 2 is similar to FIG. 1, but viewed from another angle.

FIG. 2 illustrates that the support 10 includes a main body 11, two support portions 13 substantially perpendicularly extending from two end portions of the main body 11, and two fixing portions 15. Each fixing portion 15 can protrude from one support portion 13 at the end of the support portion 13 away from the main body 11. A part of the fixing portion 15 can be exposed from the support portion 13. The two fixing shafts 20 can be coupled between the two fixing portions 15 and can be spaced apart from each other.

The main body 11 can support the driving mechanism 30. The driving mechanism 30 can include a driving member 31 fixed on the main body 11, two mounting members 35, and two moving shafts 37. The driving member 31 can include a driving body 312 mounted on the main body 11 and a driving block 313. The driving body 312 can be substantially perpendicular to the base body 212 and be substantially parallel to the support portions 13. The driving block 313 can be movably assembled to the driving body 312 and can be coupled with the moving shaft 37. The driving body 312 can move the driving block 313. The two mounting members 35 can be in substantial rectangular shape. The two mounting members 35 can be separately positioned on a side surface of the driving block 313 in parallel and can be positioned away from the driving body 312. Two moving shafts 37 can pass through the two mounting members 35, respectively. Two end portions of each moving shaft 37 can be exposed from one corresponding mounting member 35. The moving shafts 37 can be substantially parallel to and be positioned above the fixing shafts 20. The driving block 313 can move the moving shafts up and down.

Figure 3:
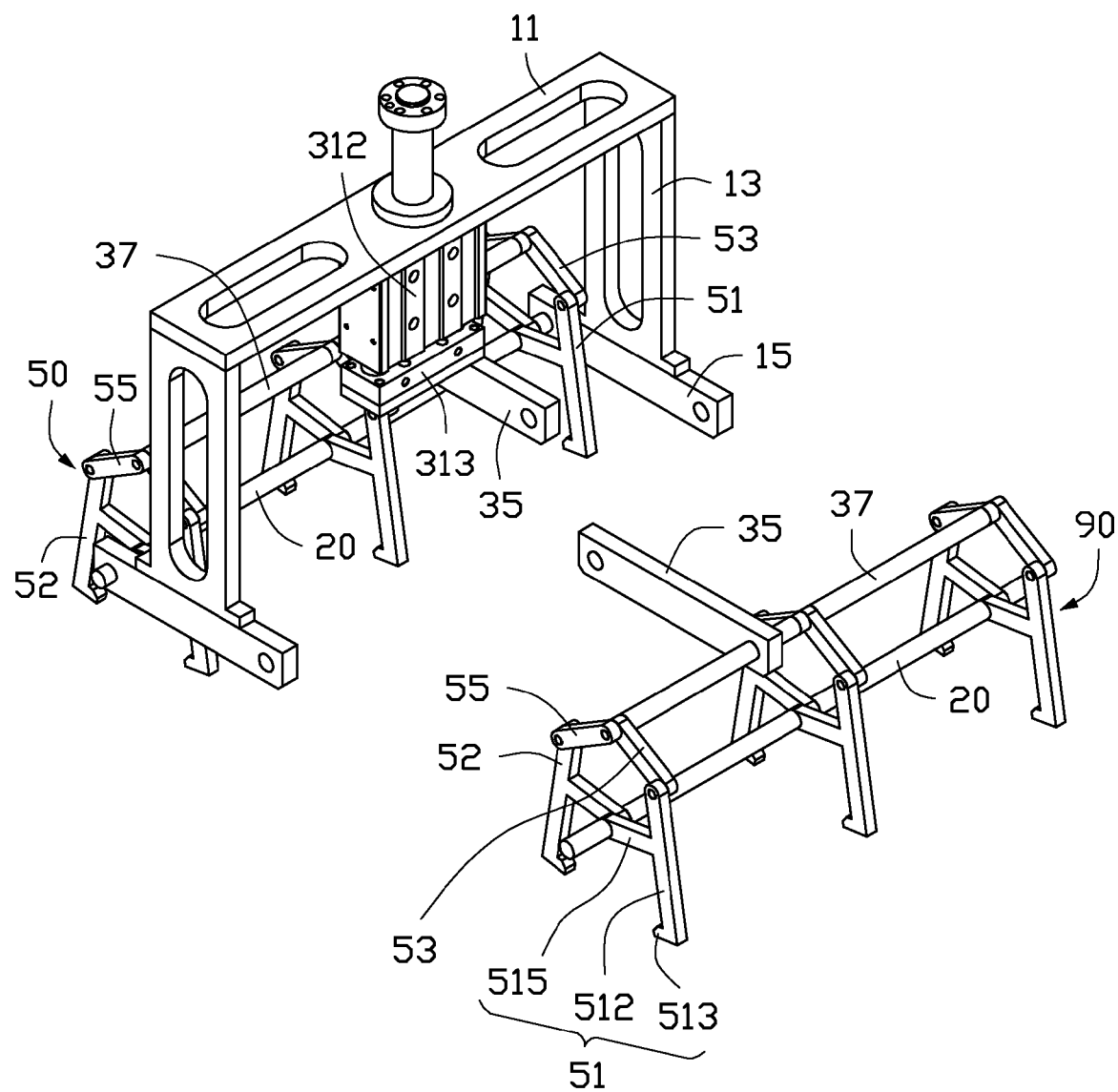
FIG. 3 is a partial and exploded view of the clamping apparatus of FIG. 1.

FIG. 3 illustrates the six clamping assemblies 50 positioned on the two moving shafts 37 and the two fixing shafts 20. The six clamping assemblies 50 can be divided into two groups including three clamping assemblies 50. The two groups of the clamping assemblies 50 are oppositely positioned. Three clamping assemblies 50 in one group can be positioned on one moving shaft 37 and can be spaced from each other. Each clamping assembly 50 can include a first clamping member 51 pivotally coupling with the fixing shaft 20, a second clamping member 52 pivotally coupling with the fixing shaft 20 and positioned adjacent to the first clamping member 51, a first connecting member 53, and a second connecting member 55. The first connecting member 53 can be hinged with the first clamping member 51 at first one end portion, and can be hinged with the moving shaft 37 at another end portion. A first end portion of the second connecting member 55 can be hinged with the second clamping member 52, and a second end portion of the first connecting member 53 can be pivoted with the moving shaft 37. The first clamping member 51, the second clamping member 52, the first connecting member 53, and the second connecting member 55 are connecting rods.

The first clamping member 51 and the second clamping member 52 have similar structures. Both the first clamping member 51 and the second clamping member 52 can include a base body 512, a clamping body 513, and a pivoting body 515. The base body 512 of the first clamping member 51 can be pivotally coupled with the first connecting member 53. The base body 512 of the second clamping member 52 can be pivotally coupled with the second connecting member 55. The clamping body 513 and the pivoting body 515 can be spaced from each other and protrude substantially perpendicularly from a same side surface of the base body 512. The clamping body 513 can be located away from the moving shaft 37. A guiding surface 5131 can be formed at an end portion of the clamping body 513 and can be located away from the base body 512. The guiding surface 5131 can be inclined relative to the base body 512 towards the end portion of the clamping body 513, which is away from the base body 512. One end portion of the pivoting body 515 away from the base body 512 can be pivoted with the fixing shaft 20. The first clamping member 51 and the second clamping member 52 can be capable of moving toward each other for clamping a workpiece 200, or away from each other for releasing a workpiece 200. In the illustrated embodiment, the first connecting member 53 and the second connecting member 55 of a same clamping assembly 50 are positioned opposite to each other. The first clamping member 51 and the second clamping member 52 of a same clamping assembly 50 are also positioned opposite to each other. In other embodiments, the number of the fixing shafts 20 is not limited to two; it can be one or three. The number of the moving shafts 37 is not limited to two; it can be one or three. The number of the clamping assemblies 50 is not limited to six; it can be one, two, or three.

The clamping apparatus 100 can further include a flange 70 (as shown in FIG. 1). The flange 70 can be positioned on the main body 11 and can be located away from the six clamping assemblies 50. The flange 70 is configured for coupling with a robot (not shown) or other similar devices.

The fixing shaft 20, the moving shaft 37, and three clamping assemblies 50 can cooperatively form a bar linkage mechanism 90 (as shown in FIG. 3). The fixing shaft 20 can be fixedly mounted in the support 10; the moving shaft 37 can be movably mounted on the driving member 31. Each clamping assembly 50 can include the first clamping member 51, the second clamping member 52, and the first connecting member 53. The first clamping member 51 can be pivotally coupled with the fixing shaft 20. The second clamping member 52 can be pivotally coupled with the fixing shaft 20. The first connecting member 53 can be hinged with the first clamping member 51 and the moving shaft 37. In addition, the second connecting member 55 can be hinged with the second clamping member 52 and the moving shaft 37. The first clamping member 51 and the second clamping member 52 are capable of moving toward each other for clamping the workpieces 200.

In assembly, the driving body 312 is fixed on the main body 11. The two mounting members 35 are separately assembled to the driving block 313 and are positioned away from the driving body 312. The two moving shafts 37 pass through the two mounting members 35. The two fixing shafts 20 are fixedly connected between the two fixing portions 15. The first clamping member 51 is pivotally coupled with the first connecting member 53 and the fixing shaft 20. The second clamping member 52 is pivotally coupled with the second connecting member 55 and the fixing shaft 20.

In use, when the driving body 312 moves the driving block 313 upward and towards the main body 11. The mounting members 35 and the moving shafts 37 can be brought upward, such that the first clamping member 51 and the second clamping member 52 can move toward to clamp the workpieces 200. When the driving body 312 moves the driving block 313 downward and away from the main body 11, the mounting members 35 and the moving shafts 37 can be moved downward, thereby the first clamping member 51 and the second clamping member 52 move away from each other for releasing the workpieces 200.

The embodiments shown and described above are only examples. Many details are often found in the art such as the other features of a driving body. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A clamping apparatus comprising:
   a support;
   a fixing shaft fixedly mounted on the support;
   a driving mechanism supported by the support, the driving mechanism comprising a driving member fixed on the support, and a moving shaft assembled to the driving member; and
   at least two clamping assemblies positioned on the fixing shaft and the moving shaft, each clamping assembly comprising a first clamping member, a second clamping member, a first connecting member, and a second connecting member, wherein the moving shaft is spaced from the fixing shaft, lengthwise extensions of the moving shaft and the fixing shaft are substantially same, the driving member is capable of driving the moving shaft to move away from the fixing shaft, such that the first clamping member and the second clamping member of each of the at least two clamping assemblies are capable of being moved toward each other for clamping a workpiece, or the driving member is capable of driving the moving shaft to move downward towards the fixing shaft, such that the first clamping member and the second clamping member of each of the at least two clamping assemblies are capable of being moved away from each other for releasing the workpiece.

2. The clamping apparatus of claim 1, wherein the first clamping member, the second clamping member, the first connecting member, and the second connecting member are connecting rods.

3. The clamping apparatus of claim 1, wherein the first clamping member comprises a base body, a clamping body protruding from a first end portion of the base body and located away from the moving shaft, a pivoting body protruding from the base body and spaced from the clamping body, one end portion of the pivoting body away from the base body is hinged with the fixing shaft, a second end portion of the base body of the first clamping member positioned away from the clamping body is pivotally coupling with the first connecting member.

4. The clamping apparatus of claim 1, wherein the second clamping member comprises a base body, a clamping body protruding from a first end portion of the base body and located away from the moving shaft, a pivoting body protruding from the base body and spaced from the clamping body, one end portion of the pivoting body away from the base body is hinged with the fixing shaft, a second end portion of the base body of the second clamping member positioned away from the clamping body is pivotally coupling with the second connecting member.

5. The clamping apparatus of claim 4, wherein the clamping body comprises a guiding surface formed at an end portion of the clamping body and located away from the base body, and the guiding surface is inclined relative to the base body towards the end portion of the clamping body away from the base body.

6. The clamping apparatus of claim 1, wherein the driving mechanism further comprises a mounting member coupling between the driving member and the moving shaft.

7. The clamping apparatus of claim 1, wherein the driving member comprises a driving body mounted on the support and a driving block movably assembled with the driving body and coupling with the moving shaft, the moving shaft is capable of being driven by the driving block and the driving body.

8. The clamping apparatus of claim 1, wherein the support comprises a main body, two support portions extending from two end portions of the main body, and two fixing portions, each of the two fixing portions couples with one support portion and is located away from the main body, the fixing shaft fixedly couples between the two fixing portions.

9. The clamping apparatus of claim 1, further comprising a flange positioned on the support away from the at least two clamping assemblies, the flange is configured for coupling with a robot.

10. A clamping apparatus comprising:
a support;
a driving member fixed on the support; and
a bar linkage mechanism comprising a fixing shaft fixedly mounted in the support, a moving shaft movably mounted on the driving member, and a clamping assembly, the clamping assembly comprising a first clamping member pivotally coupling with the fixing shaft, a second clamping member pivotally coupling with the fixing shaft, a first connecting member hinged with the first clamping member and the moving shaft, and a second connecting member hinged with the second clamping member and the moving shaft, wherein the moving shaft is spaced from the fixing shaft, lengthwise extensions of the moving shaft and the fixing shaft are substantially same, the driving member is capable of driving the moving shaft to move away from the fixing shaft, such that the first clamping member and the second clamping member are capable of being moved toward each other for clamping a workpiece, or the driving member is capable of driving the moving shaft to move downward towards the fixing shaft, such that the first clamping member and the second clamping member are capable of being moved away from each other for releasing the workpiece.

11. The clamping apparatus of claim 10, wherein both the first clamping member and the second clamping member comprises a base body, a clamping body protruding from a first end portion of the base body and located away from the moving shaft, a pivoting body protruding from the base body and spaced from the clamping body, one end portion of the pivoting body away from the base body is hinged with the fixing shaft, a second end portion of the base body of the first clamping member positioned away from the clamping body is pivotally coupling with the first connecting member, and a second end portion of the base body of the second clamping member located away from the clamping body is pivotally coupling with the second connecting member.

12. The clamping apparatus of claim 11, wherein the clamping body comprises a guiding surface formed at an end portion of the clamping body and located away from the base body, and the guiding surface is inclined from the base body to the end portion of the clamping body away from the base body.

13. The clamping apparatus of claim 10, wherein the driving mechanism comprises a mounting member coupling between the driving member and the moving shaft.

14. The clamping apparatus of claim 10, wherein the driving member comprises a driving body mounted on the support and a driving block movably assembled with the driving body and coupling with the moving shaft, the moving shaft is capable of being driven by the driving block and the driving body.

15. The clamping apparatus of claim 10, wherein the support comprises a main body, two support portions extending from two end portions of the main body, and two fixing portions, each of the two fixing portions couples with one support portion and is located away from the main body, the fixing shaft fixedly couples between the two fixing portions.

16. The clamping apparatus of claim 10, further comprising a flange positioned on the support away from the driving member, the flange is configured for coupling with a robot.

* * * * *